(12) United States Patent
Safdeye et al.

(10) Patent No.: US 7,179,414 B2
(45) Date of Patent: *Feb. 20, 2007

(54) SHOE MANUFACTURING METHOD

(75) Inventors: Michael Safdeye, Brooklyn, NY (US); Chun-Ruey Wu, Taipei (TW); Michael Stein, Yardley, PA (US)

(73) Assignee: E.S. Originals, Inc., New York, NY (US)

( * ) Notice: Subject to any disclaimer, the term of this patent is extended or adjusted under 35 U.S.C. 154(b) by 514 days.

This patent is subject to a terminal disclaimer.

(21) Appl. No.: 09/991,474

(22) Filed: Nov. 21, 2001

(65) Prior Publication Data

US 2002/0152638 A1    Oct. 24, 2002

Related U.S. Application Data

(63) Continuation-in-part of application No. 09/804,066, filed on Mar. 12, 2001, now Pat. No. 6,944,975.

(51) Int. Cl.
*B29C 45/14*    (2006.01)

(52) U.S. Cl. .................. 264/244; 264/250; 264/257; 264/275

(58) Field of Classification Search ............... 264/244, 264/257, 250, 275; 425/119, 127, 129.2
See application file for complete search history.

(56) References Cited

U.S. PATENT DOCUMENTS

| 384,483 | A | * | 8/1888 | Wakter | 36/59 R |
|---|---|---|---|---|---|
| 1,399,766 | A | | 12/1921 | Grosjean | |
| 1,587,377 | A | | 6/1926 | Grosjean | |
| 1,716,790 | A | * | 6/1929 | Mitchell | 36/59 R |
| 1,811,803 | A | | 6/1931 | Oakley | |
| 2,121,678 | A | | 6/1938 | Armor | 36/32 |
| 2,371,689 | A | | 3/1945 | Gregg et al. | 36/30 |
| 2,391,564 | A | | 12/1945 | Gregg | 36/30 |
| 2,400,487 | A | | 5/1946 | Clark | 154/46 |

(Continued)

FOREIGN PATENT DOCUMENTS

CN    2244835 Y    1/1997

(Continued)

OTHER PUBLICATIONS

Agent's confirmation (with unverified translation) for Purchase Order No. 65113 to be delivered Mar. 26, 1999 for "Chenille Slipper, White TPR with Canvas Wrap Sole".

(Continued)

*Primary Examiner*—Edmund H. Lee
(74) *Attorney, Agent, or Firm*—Kirschstein, et al.

(57) ABSTRACT

A shoe including an upper, a lower attached to the upper, and an outsole attached to the lower is presented. In one embodiment, the outsole has a ground contacting surface which includes a first section and a second section, with the first section being formed of a first material and the second section having an outer later formed of a fabric material. The first section is free of the fabric material and is instead formed of other suitable materials, such as rubber, leather, etc. The outsoles and uppers are configured so that they can easily be mixed and matched with one another for assembly of the shoe at time after each of the individual components is separately made.

8 Claims, 12 Drawing Sheets

U.S. PATENT DOCUMENTS

| | | | | |
|---|---|---|---|---|
| 2,499,751 A | 3/1950 | Hoza | | 36/9 |
| 2,603,891 A | 7/1952 | Cohn | | 36/9 |
| 3,016,631 A | 1/1962 | Servin | | 36/3 |
| 3,063,074 A | 11/1962 | Scholl | | |
| 3,352,032 A | 11/1967 | Yamaguchi | | |
| 3,672,077 A | 6/1972 | Coles | | |
| 3,676,542 A | 7/1972 | Maltby | | 264/244 |
| 3,765,978 A | 10/1973 | Matt | | 156/148 |
| 3,813,719 A * | 6/1974 | Kaschura | | 12/142 RS |
| 3,863,272 A | 2/1975 | Guille | | 2/239 |
| 3,888,026 A | 6/1975 | Dassler | | |
| 4,120,477 A | 10/1978 | Justamante | | 249/109 |
| 4,122,574 A | 10/1978 | Karalis | | 12/142 |
| 4,356,643 A | 11/1982 | Kester et al. | | 36/59 |
| 4,519,148 A | 5/1985 | Sisco | | |
| 5,053,179 A | 10/1991 | Masui et al. | | 264/257 |
| 5,505,011 A * | 4/1996 | Bleimhofer | | 36/4 |
| 5,553,399 A | 9/1996 | Strong | | 36/9 R |
| 5,725,823 A | 3/1998 | Finn et al. | | 264/247 |
| D414,920 S | 10/1999 | Cahill | | |
| D415,610 S | 10/1999 | Cahill | | |
| D415,876 S | 11/1999 | Cahill | | |
| 6,035,554 A | 3/2000 | Duncan | | |
| D423,199 S | 4/2000 | Cahill | | |
| 6,255,235 B1 * | 7/2001 | Hiraoka et al. | | 442/101 |
| 6,312,782 B1 | 11/2001 | Goldberg et al. | | |
| 6,321,464 B1 | 11/2001 | Oberg et al. | | |
| 6,430,844 B1 * | 8/2002 | Otis | | 36/59 R |
| 6,571,491 B2 * | 6/2003 | Safdeye et al. | | 36/59 R |

FOREIGN PATENT DOCUMENTS

| | | | |
|---|---|---|---|
| CN | 2405451 Y | | 11/2000 |
| CN | 2456508 | | 10/2001 |
| CN | 2495154 | | 6/2002 |
| DE | 4015138 | | 11/1991 |
| FR | 2617382 | | 1/1989 |
| JP | 2-283303 A | * | 11/1990 |
| JP | 2000-23707 | * | 1/2000 |
| TW | 83100172 | | 1/1994 |
| TW | 83102659 | | 3/1994 |

OTHER PUBLICATIONS

Color pictures of chenille slipper allegedly corresponding to Purchase Order No. 65113, slippers including a hang tag, and an image of the alleged hang tag including handwritten and unverified translations into English.

Weisner Purchase Orders No. 11051 and No. 11052 for ladies clogs with open knit collar, Style No. 9122Navy and No. 9122Burg, respectively (Mar. 29, 1999).

Agent's confirmations showing Purchase Order No. 11051 and No. 11052 and the delivery date of Jul. 15, 1999 in English (2 pages).

New York Ruling D89353 on behalf of Weisner Products, Inc. (Apr. 21, 1999; 2 pages).

New York Ruling E86018 on behalf of Weisner Products, Inc. (Sep. 13, 1999; 2 pages).

Copy of Complaint No. 4:03CV00774TCM.

Copy of Dority & Manning letter, Jun. 3, 2003.

* cited by examiner

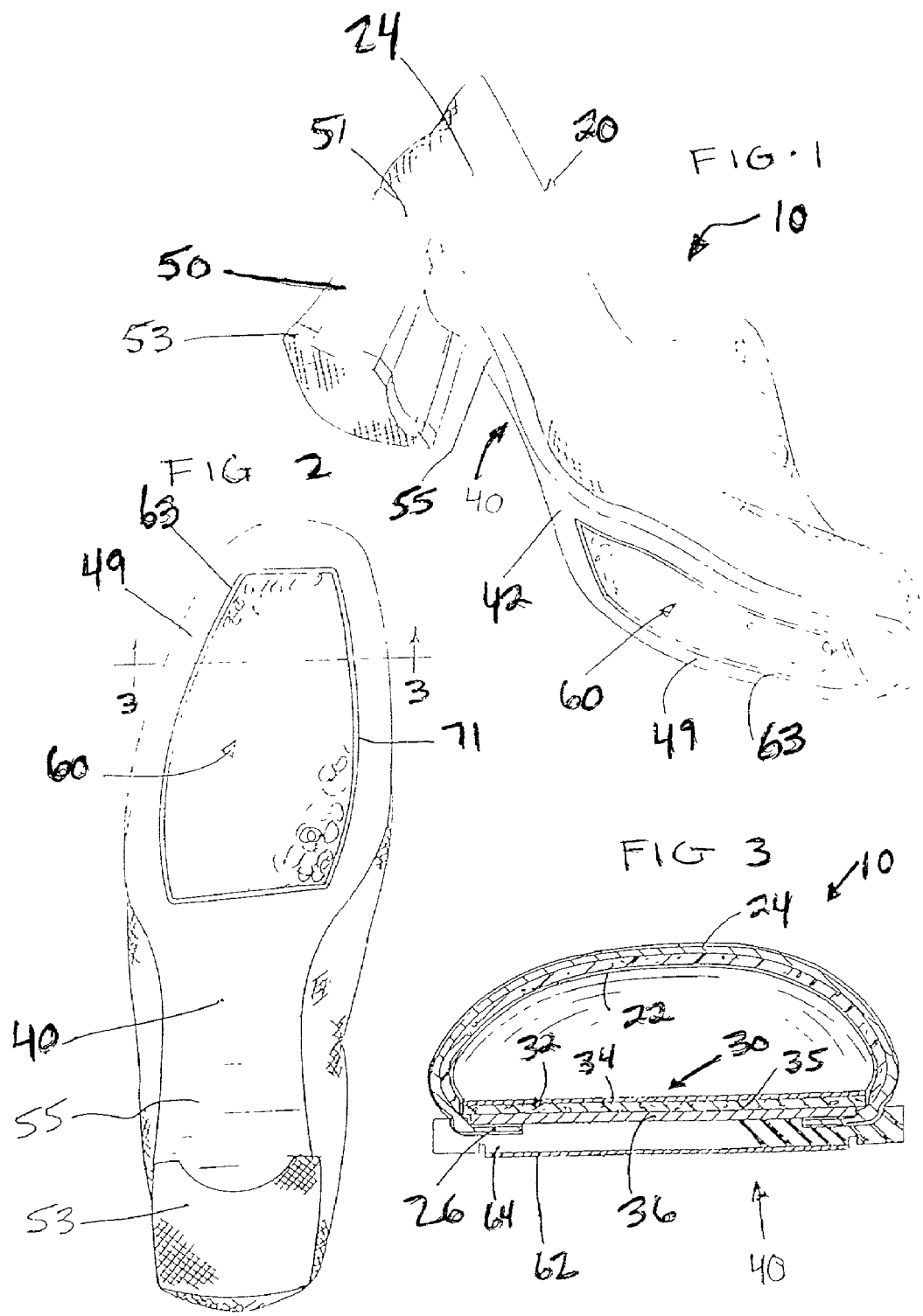

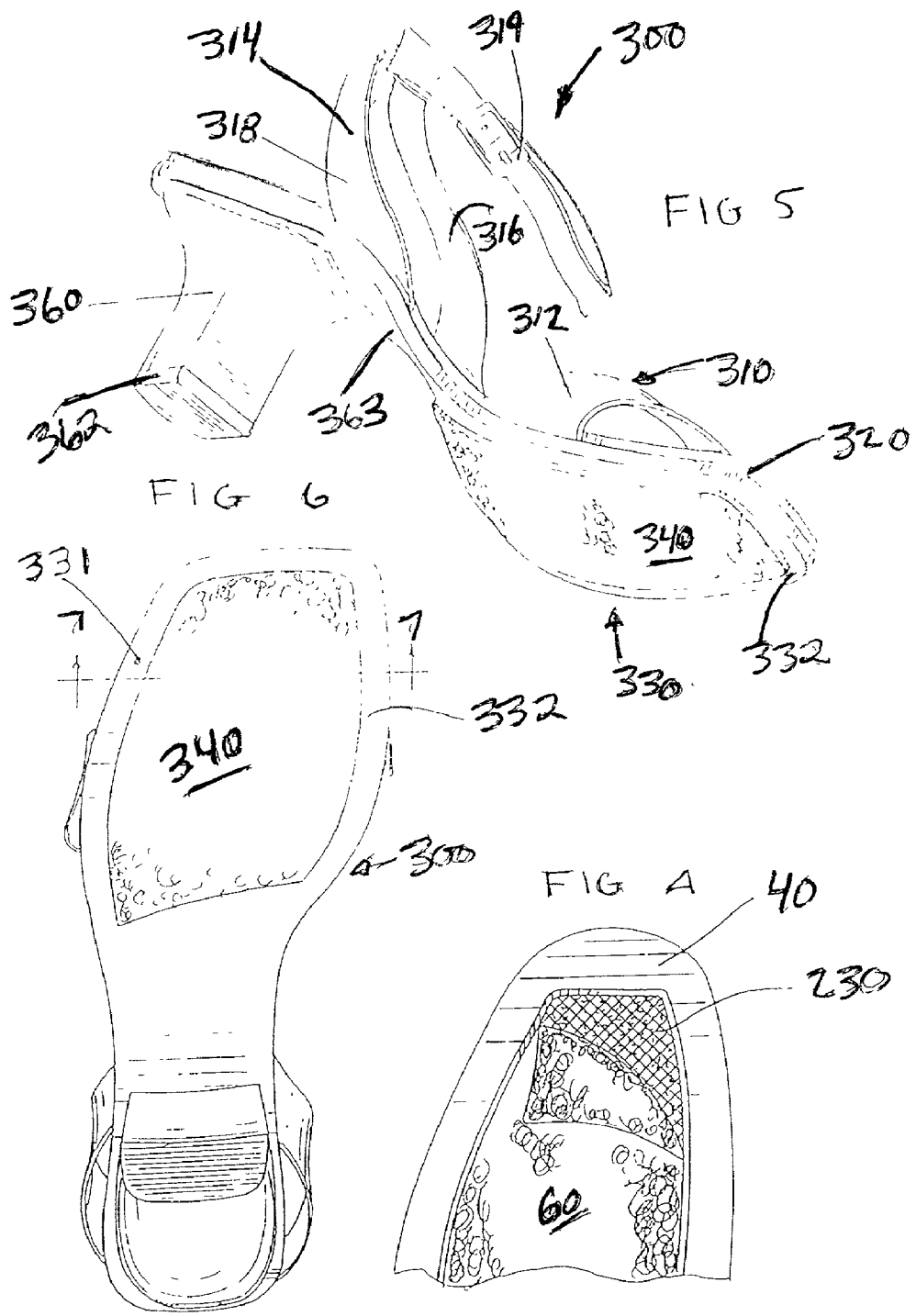

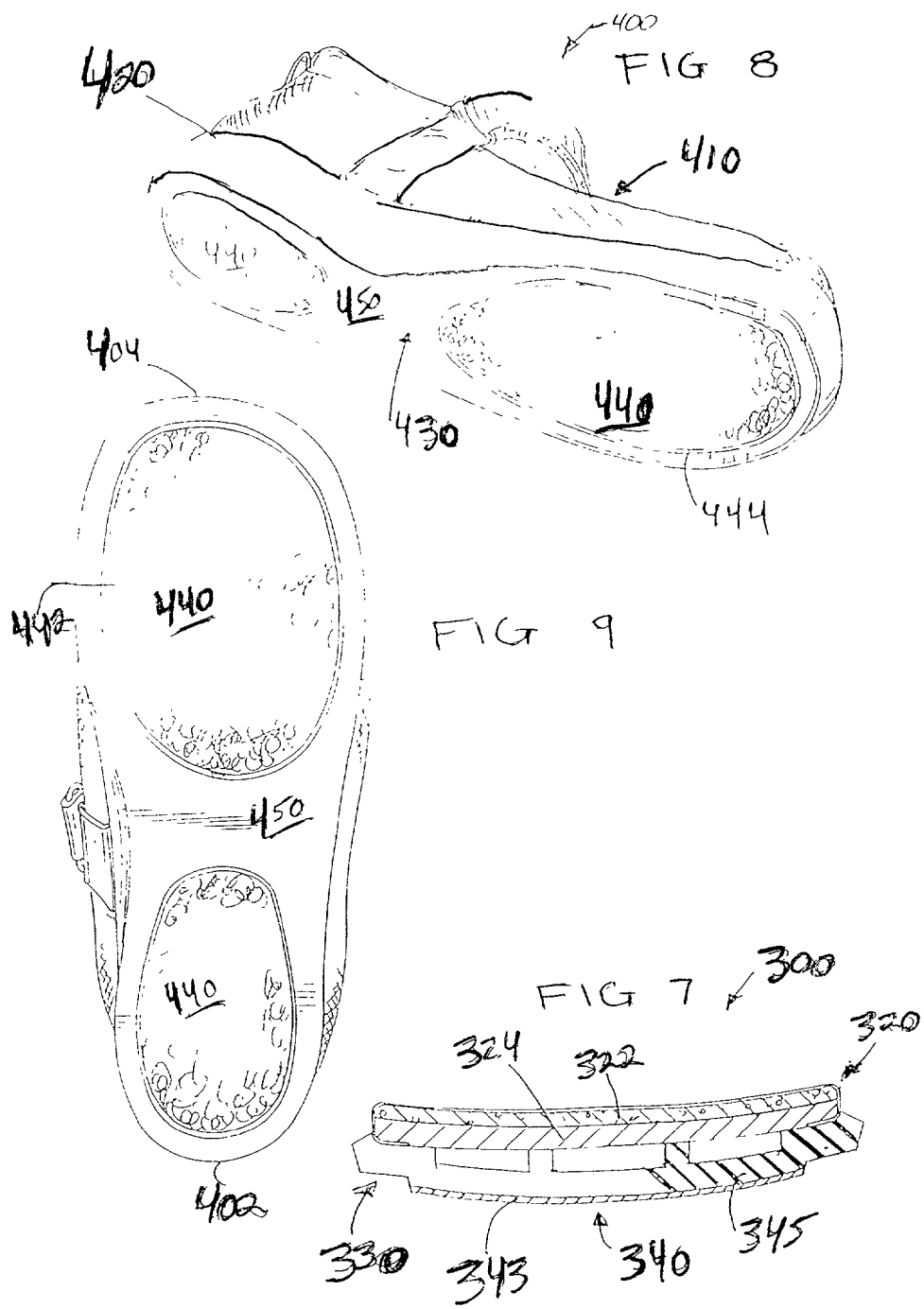

SHOE MANUFACTURING METHOD

CROSS REFERENCE TO RELATED APPLICATION

This application is a continuation-in-part of U.S. patent application Ser. No. 09/804,066, filed Mar. 12, 2001, now U.S. Pat. No. 6,944,975, an which is incorporated herein by reference in its entirety.

TECHNICAL FIELD

The present invention relates generally to a shoe and more specifically, relates to a shoe having a fabric material disposed on at least a portion of the outsole and to a manufacturing process thereof.

BACKGROUND OF THE INVENTION

A shoe is generally formed of an upper, a lower attached to the upper, and an outsole attached to the lower. The outsole of the shoe is the exposed portion of the sole that contacts the ground or other supporting surface. The outsole provides many characteristics of the shoe such as the shoe's traction and stability with respect to the intended supporting surface. For example, the outsole of the shoe may be provided with some type of traction elements arranged in a pattern to provide a gripping action between the outsole and the ground or supporting surface. The outsole should also be manufactured so that it offers extended wear to permit the shoe to be worn for a lengthy period of time.

Often, the outsole of the shoe is formed of a rubber material or leather in designer shoes and the like. In men's and women's shoes, the outsole is very often substantially smooth and this can cause traction problems. For example, such outsoles are often very slippery because of their smooth texture and this increases the chances that the user may accidently slip or slide during normal use. The risk of slipping and sliding is increased significantly when the surface or supporting surface is wet or otherwise in a slippery state.

The outsole is an important component of the shoe for an additionally entirely unrelated reason which has gone unrecognized in the art of shoe sole construction. As the economies of most countries become more and more internationalized, international commercial transactions invoke national customs tariffs that generally must be paid when goods are shipped. Under the Harmonized Tariff Schedules of each country, goods are classified under various categories. For example, most footwear is classified under Chapter 64 of the United States Harmonized Tariff Schedules which covers the importation of goods into the United States. Within this chapter, the following major headings are recited for footwear:

| | |
|---|---|
| 6401 | Waterproof Rubber or Plastic Footwear; |
| 6402 | Other Footwear with Uppers and Outersoles of Rubber or Plastic; |
| 6403 | Footwear with Uppers of Leather and Outersoles Of Rubber, Plastic, Leather, or Composition Leather; |
| 6404 | Footwear with Uppers of Textiles and Outersoles of Rubber, Plastic, Leather, or Composition Leather; and |
| 6405 | Other Footwear. |

Accordingly, footwear is generally classified in a given heading based upon the material of the upper and the material of the outersole. Consequently, the outsole plays an important role in determining the rate of duty which is to be applied to the specific footwear article. Depending upon the material which is used to manufacture the upper and the sole, the rate of the duty may vary significantly. For example, the rate of duty may range from 37.5% ad valorem for many common types of footwear to 3% ad valorem for certain types of sandals and similar footwear. In determining the applicability of a particular section of one chapter of the United States Harmonized Tariff Schedules, knowledge of specific details of the material is necessary. For example, a classification may be based on the type of material that is present on 50% or more of the bottom surface of the shoe (outersole) that contacts the ground.

Over many years, manufacturers have focused their attention on improving the traction properties of shoe outsole construction, but have not recognized that a price advantage can be had by combining materials in the outer shoe sole construction.

What is needed in the art and has heretofore not been available is an outsole and method of manufacture thereof which offers slip resistance and other desirable properties in addition to providing a competitive advantage to the manufacturer based on its construction.

SUMMARY OF THE INVENTION

According to the present invention, a shoe including an upper, a lower attached to the upper, and an outsole attached to the lower is presented. In one embodiment, the outsole has a ground contacting surface which includes a first section and a second section, with the first section being formed of a first material and the second section having an outer layer formed of a fabric material. The first section is free of any fabric material and is instead formed of other suitable materials, such as rubber, leather, etc.

In another embodiment, the ground contacting surface substantially consists of a shaped fabric member having the fabric material disposed on an outer surface thereof. The shaped fabric member extends below other surrounding sections of the outsole which do not contain a fabric material, so as to form a ground contacting surface of the outsole.

According to one embodiment, the outsole is preferably formed using a molding process and, more specifically, is formed using a two stage molding process. The fabric material is not just layered over an existing outsole construction but rather forms an integral part of the outsole construction itself. In one embodiment, a shaped fabric member having the fabric material disposed on an outer surface thereof is formed during a first molding process and then the shaped fabric member is disposed in a second mold. A second molding process is conducted and the remaining portion of the outsole is formed around the shaped fabric member which becomes an integral part of the outsole. The result is that an integral outsole is produced in which a substantial amount of the ground contacting surface of the outsole is defined by the fabric material. Preferably, greater than 50% of the ground contacting surface of the outsole includes the fabric material.

The outsole provides increased slip resistance, is durable, and provides a competitive manufacturing advantage.

In another aspect, the outsole is preferably formed in an independent operation and then at a later time is attached to the lower and/or upper of the shoe. This is in contrast to prior art shoe construction where the upper, midsole and outsole are assembled together and then placed into an appropriate device for causing bonding and attachment between these members. By independently forming the outsole, certain advantages are realized. First, the outsoles may be formed at a completely different location and second, interchangeability and customization are provided because one outsole may be combined and attached to any number of lowers and/or uppers. This reduces overall manufacturing costs and increases the number of products that may be made available.

Other features and advantages of the present invention will be apparent from the following detailed description when read in conjunction with the accompanying drawings.

BRIEF DESCRIPTION OF THE DRAWINGS

The foregoing and other features of the present invention will be more readily apparent from the following detailed description and drawings of illustrative embodiments of the invention in which:

FIG. 1 is a bottom perspective view of one exemplary type of shoe having an outsole in accordance with one embodiment;

FIG. 2 is a bottom plan view of the shoe of FIG. 1;

FIG. 3 is a cross-sectional view taken along the line 303 of FIG. 2;

FIG. 4 is a bottom plan view of the shoe of FIG. 1 showing a fabric portion of the outsole peeled back to expose a backing portion of the outsole;

FIG. 5 is a bottom perspective view of another exemplary type of shoe having an outsole in accordance with another embodiment;

FIG. 6 is a bottom plan view of shoe of FIG. 1;

FIG. 7 is a cross-sectional view taken along the line 7—7 of FIG. 6;

FIG. 8 is a bottom perspective view of another exemplary type of shoe having an outsole in accordance with another embodiment;

FIG. 9 is a bottom plan view of the shoe of FIG. 8;

DETAILED DESCRIPTION OF THE PREFERRED EMBODIMENTS

Figure 10:
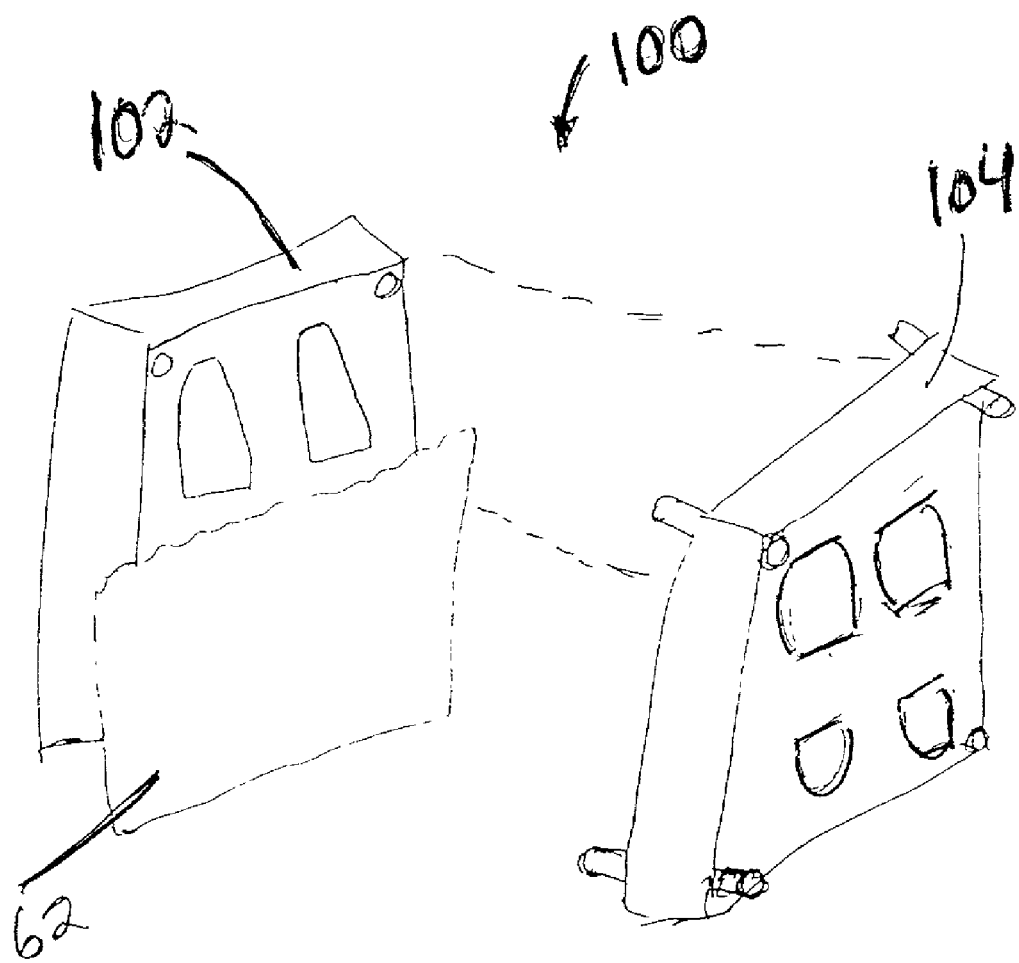
FIG. 10 is an exploded perspective view of a first mold including first and second dies.

The present invention will be first described with reference to FIGS. 1 through 4. FIG. 1 illustrates one exemplary type of shoe 10 having an upper 20, a lower 30 attached to the upper 20, and an outsole 40 attached to the lower 30. The shoe 10 is of a style which is commonly worn by women in both workplace settings and social settings. The style and nature of shoe 10 is merely exemplary and it will be understood that the present invention applies to a wide range of types of shoes, including but not limited to men's, women's, and children's shoes.

FIG. 3 is a cross-sectional view of the shoe 10 showing its construction in greater detail. The upper 20 includes a soft cushioned material, such as a fabric-backed foam 22 at an interior portion of the shoe 10 for resiliently engaging a wearer's foot. The fabric-backed foam 22 thus serves to cushion the wearer's foot during use and reduce impact between the foot and the surrounding environment. The upper 20 also includes an exterior cover 24, such as a high pile fabric, coupled to the fabric-backed foam 22. For example, the exterior cover 24 may be stitched to the fabric-backed foam 22. These two components may be attached using other conventional techniques, such as using an adhesive (i.e., cement or the like). It will be appreciated that the upper 20 may be formed of a number of different materials and foam and high pile fabric are merely exemplary materials. For example, the exterior cover 24 may be formed of synthetic materials, leather or the like or velvet or the like, especially for women's shoes.

The lower 30 includes a base material 32 at the interior of the shoe 10 for engaging the wearer's foot. Typically, the base material 32 is formed of a foam or a fabric and may be formed of multiple layers. For example, the base material 32 of the exemplary shoe 10 actually includes a thin top layer 34 which may be formed of any number of materials, including a fabric and a suitable plastic material. Underneath the top layer 34 is a cushion element 35 which preferably has an identical shape as the top layer 34. The cushion element 35 is preferably formed of a soft cushioned material, such as a foam. It will be appreciated that the top layer 34 and cushion element 35 may be formed as a single integral piece.

Underneath the cushion element 35, a support layer 36 is provided. The support layer 36 is also preferably similarly or identically shaped as the top layer 34 and the cushion element 35 and is designed to act as a backbone of the lower 30. The support layer 36 is formed of a rigid material so that it maintains its shape under application of force, such as the weight of the wearer. The support layer 36 may be formed of any number of rigid materials, such as a rigid plastic, a rigid reinforced cardboard member, etc. The cushion element 35 is coupled to the support layer 36 using any number of techniques, including applying an adhesive to a backside of the cushion element 35 and then applying the cushion element 35 to a topside of the support layer 36.

The upper and lower 20, 30 of the shoe are attached to one another using any number of techniques. For example and as shown in the cross-sectional view of FIG. 3, a portion of the upper 20, and more specifically a portion 26 of the exterior cover 24, is tucked underneath an edge of the lower 30 to secure the upper 20. The exterior cover 24 may be secured to the lower 30 by applying an adhesive (e.g., cement) or the like to the area where the exterior cover 24 and the lower 30 meet. Other conventional techniques may be used such as stitching the upper 20 to the lower 30. For example, a molding process may be used so as to capture the portion 26 of the exterior cover 24 within the support layer 36, thereby causing the upper 20 to become attached to the lower 30.

In accordance with an exemplary embodiment, the outsole 40 is made of a rigid material so as to provide support to the outsole 40 and includes an outer surface 42. The outsole 40 may have any number of shapes depending upon the type of shoe 10. For example, shoe 10 is a typical women's shoe and therefore includes a prominent heel 50. When shoe 10 has a heel, such as heel 50, the heel 50 may be formed as a separate member from the outsole 40 or the heel 50 may be integrally formed as part of the outsole 40. In the exemplary shoe 10, the heel 50 is a separate member which is coupled to the backing layer 42 using known techniques. Preferably, an upper portion of the heel 50, in the form of a lip 51, extends around a heel portion of the exterior cover 24. This lip portion 51 is coupled to the adjacent heel portion of the exterior cover 24 using an adhesive or the like. A bottommost portion 53 of the heel 50 engages the ground or support surface and therefore may be formed of a suitable material for such wear. For example, the bottommost portion 53 may be formed of the same material as the other portions of the heel 50 or may be formed of a different material. The major portion of the heel 50 is preferably formed of a rigid material, such as a rigid plastic or wood. The bottommost portion 53 may be formed of this type of material or may be in the form of a shaped rubber pad which is coupled to the other portions of the heel 50, as shown in FIGS. 1–2.

As is known in the art, different portions of the outsole 40 of shoe 10 are referred to differently. The outsole 40 of shoe 10 includes the heel 50 formed at one end and includes a ball portion 49 formed generally at an opposite end of the shoe 10. The ball portion 49 is the portion of the outsole 40 which primarily contacts the ground during normal use of the shoe 10. Between the ball portion 49 and the heel 50, the outsole 40 includes a shank 55 which does not contact the ground during wear of the shoe 10. The shank 55 is thus angled upwardly away from the ground surface when the ball portion 49 and the heel 50 are seated against the ground. The height of the heel 50 determines the angle between the shank 55 and the ground surface.

The outsole 40 also includes a shaped fabric member 60 which forms a part of the outsole 40 and has a predetermined shape. As best shown in FIG. 3, the shaped fabric member 60 includes a thin, flexible, fabric sheet material 62 and a fabric backing layer 64. Preferably, the fabric sheet material 62 is formed of a non-woven fabric, such as polyester fibers mixed with cotton. Thus, the fabric sheet material 62 is not produced using a weaving process but rather is produced using other suitable techniques for forming a non-woven fabric. For example, the polyester fibers may used to form a needle felt which is then impregnated with a material before being dried and pressed. It will be appreciated that the shaped fabric member 60 may have any number of shapes and sizes depending upon the shoe design and other parameters such as the amount of contact between the outsole 40 and the ground or support surface.

The shaped fabric member 60 is disposed on a significant and preferably substantial portion of the outsole 40 which engages the ground or support surface during normal use. More specifically, the shaped fabric member 60 preferably occupies an area which is at least greater than 50% of the area of the outsole 40 which contacts the ground. In the exemplary shoe 10 shown in FIGS. 1–3, the ground contacting portion of the outsole 40 includes the bottommost portion 53 of the heel 50 and the ball portion 49. It will be appreciated that the percent of the ground contacting surface of the shoe 10 that includes the shaped fabric member 60 will depend upon a number of factors, including but not limited to the type of shoe 10 (i.e., high heel or not) and the area of ground contacting surface as a percentage of the total area of the outsole 10. For example, the shaped fabric member 60 preferably occupies greater than 50% to about 90% of the entire ground contacting surface of the outsole 40.

In the shoe 10, the shaped fabric member 60 is disposed within the outsole 40 and more preferably is disposed within the ball portion 49 of the outsole 40. Preferably, the shaped fabric member 60 is integrally formed as part of the outsole 40 as will be described hereinafter. The bottommost portion 53 of the heel 50 is formed of a rubber or other suitable material. A gap 63 is formed between the fabric sheet material 62 and a surrounding edge 71 of the backing layer 42 of the outsole 40. As shown in the figures, the outer surface 42 of the outsole 40 surrounds the shaped fabric member 60. When the shaped fabric member 60 is disposed within the outsole 40, an outer face of the fabric sheet material 62 is preferably substantially planar to the surrounding outer surface 42 of the outsole 40 so that during use, the outsole 40 engages the ground in a relatively uniform manner.

The fabric backing layer 64 is preferably formed of a shape-retaining material, for example, a rubber or plastic material. The fabric backing layer 64 and the fabric sheet material 62 are integrally connected to one another by any number of techniques, including using a molding process as will be described in greater detail hereinafter. In addition, the surrounding outsole 40 and the fabric backing layer 64 may be formed of the same material or may be formed of different materials. In one exemplary embodiment, both are formed of a thermoplastic. In another embodiment, both are formed of a material that is referred to herein as a thermoplastic rubber.

The shaped fabric member 60 along with the surrounding outsole 40 provide the shoe 10 with a slip-resistance, shape-retaining partially fabric outsole 40. It is also contemplated that the backing layer 42 and/or the fabric backing layer 64 may have a tread pattern formed thereon for a decorative purpose, a functional purpose, or both. For example, the surface 42 and the layer 64 can have a tread pattern, and in the case of the fabric backing layer 64, the fabric sheet material 62 can closely conform to the pattern, e.g., follow the contour thereof.

The use of the shaped fabric member 60 also has another associated advantage: the provision of the fabric sheet material 62 on greater than 50% of the ground contacting surface area of the outsole 40 enables the shoe 10 to be classified under a different section of the United States Harmonized Tariff Schedules and therefore permits the manufacturer of the shoe 10 to pay a different, lower rate of tariff duty. In other words, the classification of the shoe 10 for tariff purposes depends, in part, on the constituent material of the upper 20 and the constituent material of the outsole 40 (based upon the greatest surface area in contact with the ground). In the exemplary shoe 10, the upper 20 is formed of a textile material and the constituent material of the outsole 40 is also a textile material because the material which occupies the greatest surface area in contact with the ground is the fabric sheet material 62 (a material classified as a textile).

By having both the upper 20 and the outsole 40 formed of a textile material, the shoe 10 can be classified under "Other Footwear, with uppers of textile materials, Other" which has a lower rate of duty than footwear having a textile upper and an outersole formed of rubber, plastic, leather, or composition leather. Under the current United States Harmonized Tariff Schedules, the shoe 10 of the present invention is classifiable under subheading 6405.20.90, which carries a 12.5% rate of duty so long as greater than 50% of the ground contacting surface area of the outsole 40 is occupied by the fabric sheet material 62. This is significantly lower than a 37.5% rate of duty applied to many types of footwear with outersoles of rubber, plastics, leather or composition leather and uppers of textile materials. Thus, associated costs for the overall manufacturing and delivering process can be significantly reduced by decreasing the rate of duty which is applied to the footwear (shoe 10). This results in a competitive advantage.

The manufacture of shoe 10 and more specifically, the outsole 40 will now be described in greater detail with reference to FIGS. 1–3 and 10–12. A two step molding process is preferably used to manufacture the outsole 40. In a first molding process, the shaped fabric member 60 is formed. Initially, a piece of the fabric sheet material 62 is cut to a predetermined shape and size. Preferably, the fabric sheet material 62 is a non-woven fabric, such as polyester fibers with cotton. This cut piece of the fabric sheet material 62 is then inserted into a first mold 100. The first mold 100 is a conventional mold having a first shaped die 102 and a second shaped die 104. The first and second dies 102, 104 have one or more cavities formed therein which define the shape of the shaped fabric member 60 and are generally shaped so as to be accommodated in the ball portion 49 of the outsole 40. The cut piece of fabric sheet material 62 is held in place again the first shaped die 102.

The first and second dies 102, 104 are heated to a predetermined temperature which permits the molding process to proceed without damaging or destroying the fabric sheet material 62. The predetermined temperature which is required for the molding process will depend upon a number of factors, including the type of thermoplastic resin used in the molding process. In one exemplary embodiment, the first and second dies 102, 104 are heated to a temperature of about 120° C. when a thermoplastic rubber is used to form the fabric backing layer 64. The first and second dies 102, 104 are pressed together with the fabric sheet material 62 being held in place against the first die 102 and then the thermoplastic rubber is injected into the first mold 100 after the thermoplastic rubber has been melted to a softened state by being exposed to a sufficient temperature (120° C.).

Because the thermoplastic rubber is in a softened state, it is able to flow throughout a cavity formed by the first and second dies 102, 104. The thermoplastic rubber forms the shape of the fabric backing layer 64 once the thermoplastic rubber cools after a predetermined time period in which the temperature of the first mold 100 is reduced. The result is that the shaped fabric member 60 is formed and the thermoplastic rubber and the fabric sheet material 62 are bonded to one another by the heating process of the molding operation. Once the shaped fabric member 60 has sufficiently cooled down, the first and second dies 102, 104 are opened and the shaped fabric member 60 is removed therefrom. Excess fabric sheet material 62 is cut off from the shaped fabric member 60 to provide for the shaped fabric member 60 shown in FIG. 11. As previously discussed, the shaped fabric member 60 includes the fabric sheet material 62 bonded to the fabric backing layer 64.

It will also be appreciated that the thermoplastic rubber initially comes in the form of pellets which are placed into a hopper of the like and then heated at a predetermined temperature above the melting point causing the pellets to melt into a molten liquid of thermoplastic rubber. This process typically does not take place right at the first and second dies 102, 104 but rather at a location that is at least slightly removed from the dies. The melted thermoplastic rubber is then introduced into the first and second dies 102, 104 under pressure using injection molding techniques and equipment. In this embodiment, the first and second dies 102, 104 are not heated to high temperatures and in fact may not be required to be heated at all, depending upon the type of material used. So long as the molten thermoplastic rubber is introduced into the first and second dies 102, 104 at a temperature above its melting point and it is able to freely flow throughout the dies 102, 104 so as to sufficiently fill the mold area and produce the shaped fabric member 60, then the first and second dies 102, 104 do not have to be preheated before introduction of the molten thermoplastic rubber. The heat of the molten thermoplastic rubber will cause the first and second dies 102, 104 to be heated due to heat transfer therebetween.

Figure 11:
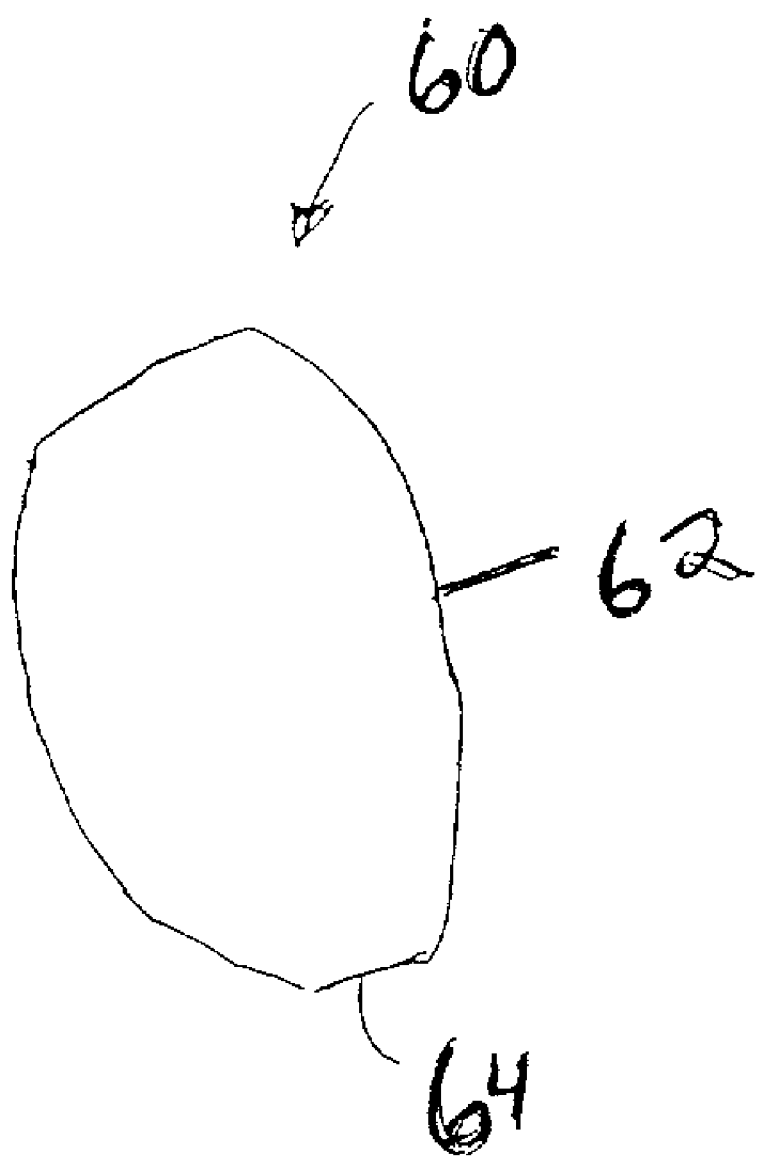
FIG. 11 is perspective view of a shaped fabric member formed during a process using the first mold of FIG. 10 and for use in an outsole of one of the prior embodiments.
Figure 12:
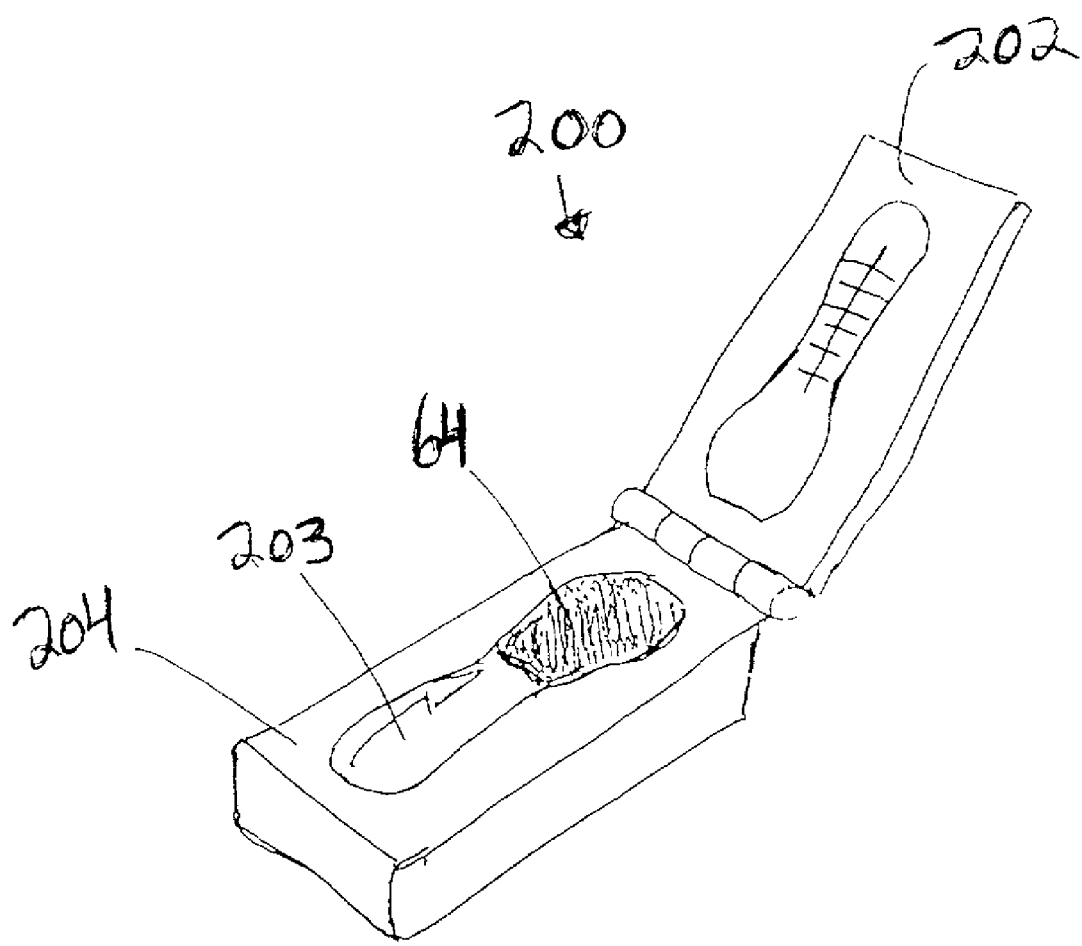
FIG. 12 is a perspective view of a second mold in an open position, the second mold including first and second dies, with the shaped fabric member of FIG. 11 being placed in one of the first and second dies.

In a second molding operation, the shaped fabric member 60 is placed into a second mold 200, shown in FIG. 12. The second mold 200 includes a first die 202 and a second die 204. The first and second dies 202, 204 define a cavity which is generally in the shape of the outsole 40. It will be appreciated that the cavity may not necessarily define the entire heel structure 50 of the outsole 40 but will likely define the remaining portions, e.g., the shank 53 and the ball portion 49. The shaped fabric member 60 (FIG. 11) is inserted into the first mold 202 with the fabric sheet material 62 facing a bottom section 203 of the first die 202. Consequently, the fabric backing layer 64 faces the second mold 204 when the second die 204 is closed.

The first and second dies 202, 204 are heated to a predetermined temperature and are closed with respect to one another. Once again, the predetermined temperature is a temperature at which the first and second dies 202, 204 will not damage the fabric sheet material 62 but will permit (1) the thermoplastic rubber forming the fabric backing layer 64 to resoften and (2) permit a second thermoplastic rubber material to soften sufficiently so that it may be injected into the second mold 200. Preferably, the predetermined temperature of the second mold 200 is greater than the predetermined temperature of the first mold 100. In one exemplary embodiment, the predetermined temperature of the second mold 200 is from about 160° C. to about 170° C. It will be appreciated that suitable molding temperatures will vary depending upon a number of parameters, such as the operating conditions and the type of thermoplastic rubber being used.

The second thermoplastic rubber material is injected into the second mold 200 so that if flows within the cavity formed by the first and second dies 202, 204. Because the fabric backing layer 64 is softened, the heated, injected second thermoplastic rubber material may bond with the fabric backing layer 64. In one embodiment, the thermoplastic rubber material used in both the first and second molds 100, 200 is the same material. It will be appreciated that the thermoplastic rubber material used in the first and second molds 100, 200 may be different materials. After heating the materials in the second mold 200 for a sufficient time period, the dies 202, 204 are cooled causing the resultant outsole 40 to cool. After a sufficient cooling period, e.g., several minutes (i.e. 6 or more minutes), the first and second dies 202, 204 are opened and the outsole 40 is removed.

The outsole 40 preferably has the shaped fabric member 60 integrally formed as a part thereof due to the bonding between the fabric backing layer 64 and the surrounding outsole 40. Preferably, the second mold 200 is configured so that the fabric sheet material 62 is not in contact with the second thermoplastic rubber that is injected into the second mold 200. In the shoe 10, the gap 63 separates the fabric sheet material 62 from the surrounding outer surface 42 of the outsole 40. In other words, the outsole 40 is formed around the shaped fabric member 60 so that the ground contacting surface of the outsole 40 is formed of the fabric sheet material 62 and a portion of the outer surface 42 with both components being preferably generally planar with one another and exposed to contact the ground.

As with the first molding process, the second molding process may be conducted without heating of the first and second dies 202, 204 depending upon the characteristics of the second thermoplastic rubber. If the second thermoplastic rubber is suitable for such application, this material is injected under pressure into the first and second dies 202, 204 in the same manner discussed above with reference to the first molding process to form outsole 40.

After having formed the outsole 40 using the above-described method, the outsole 40 is then incorporated into the shoe 10 by attaching the outsole 40 to the lower 30 to form the shoe 10. As previously mentioned, the outsole 40 is attached to the lower 30 using any number of techniques, including using an adhesive, such as cement, stitching, or another suitable process, including a subsequent molding operation in which the support layer 36 is bonded to the fabric backing layer 64.

As shown in FIG. 4, the outsole 40 and the corresponding manufacturing process may be modified so that a pattern 230 is formed as part of the shaped fabric member 60. This pattern 230 may be decorative in nature and also provides some functionality as it may be designed to increase the gripping action of the outsole 40. In one embodiment, a bottom of the first die 102 is modified by forming the pattern 230 thereon. For example, small diamond shaped objects may be formed on the first die 102 (FIG. 10) and the fabric sheet material 62 is laid over the first die 102. During the first molding process, the pattern 230 is transferred onto the shaped fabric member 60 as a result of the injection and pressing action of the thermoplastic rubber. The resultant shaped fabric member 60 thus includes a textured surface defined by the pattern 230.

FIGS. 5–7 show another embodiment. In this embodiment, a shoe 300 is presented and is generally in the form of a women's shoe having an open aired toe. The shoe 300 includes an upper 310, a lower 320 attached to the upper 310, and an outsole 330 attached to the lower 320.

Because of the open toe nature of shoe 300, the upper 310 is formed of a toe strap 312 and an ankle strap 314. The toe and ankle straps 312, 314 may be formed of any number of suitable materials and in one embodiment, the straps 312, 314 are formed of a backing layer 316 and an exterior cover 318. The backing layer 316 may comprise a fabric backed foam or the like with the exterior cover 318 being attached to the backing layer 316 using known techniques, such as stitching, etc. The exterior cover 318 may be formed of any number of materials, including a high pile fabric. In this embodiment, the ankle strap 314 also includes a buckle assembly 319 for securing the ankle strap 314 around a wearer's ankle. The toe strap 312 is designed to extend across the upper portion of the foot near the wearer's toes to secure the front portion of the foot within the shoe 300. The toe strap 312 should be flexible so as to accommodate foots of different sizes.

The lower 320 includes a fabric-backed foam 322 and a support member 324. The fabric-backed foam 322 provides a cushioned surface for the wearer to place his/her foot. The support member 324 serves to provide a support platform for the wearer's foot and therefore is formed of a rigid material. For example, the support member 324 may be formed of a rigid reinforced cardboard member, a plastic member, a wooden member, etc. so long as the support member 324 retains its shape and provides adequate support to the wearer's foot.

The upper 310 is attached to the lower 320 using conventional techniques, including stitching or securing ends of the straps 312, 314 to the lower 320 and more specifically, by tucking these ends between the support member 324 and the outsole 330. An adhesive or other material may be used to secure the straps 312, 314 to at least one of the support member 324 and the outsole 330.

The outsole 330 in this embodiment includes a shaped fabric member 340 formed as part of the outsole 330 and a heel 360. The outsole 330 also includes an outer surface 332. As best shown in FIGS. 5 and 7, the shaped fabric member 340 is disposed in a ball portion 331 of the outsole 330 and protrudes below the surrounding portions (outer surface 332) of the outsole 330 such that the shaped fabric member 340 is the ground contacting portion of the outsole 330. During normal wear, the wearer contacts the ground surface with the shaped fabric member 340 because it extends below the surrounding sections of the outsole 330.

The heel 360 is attached to the outer surface 332 using conventional techniques, e.g., use of an adhesive, and a bottommost portion 362 of the heel 360 preferably includes a rubber or plastic piece which reduces wear of the heel 360 and provides a gripping surface. A shank portion 363 of the outsole 330 is formed between the heel 360 and the ball portion 331. The shank portion 363 is defined by the outsole 330 and does not include the shaped fabric member 340. The shaped fabric member 340 is thus only provided on sections of the outsole 330 which contact the ground surface during normal wear.

As best shown in FIG. 7, the shaped fabric member 340 is formed of a fabric sheet material 343 and a fabric backing layer 345. As will be described hereinafter, the fabric backing layer 345 is preferably integrally bonded to the material forming the outsole 330 and preferably, the layer 345 and the outsole 330 are formed of the same material so that it will appear to the wearer that the fabric sheet material 343 is simply attached to a particular section of the outsole 330. The fabric backing layer 345 is the material lying immediately underneath the fabric sheet material 343 and serves to define a platform extending downwardly from the surrounding sections of the outsole 330. In this manner, the fabric sheet material 343 is only in contact with the fabric backing layer 345 and not the surrounding sections of the outsole 330.

In this embodiment and in accordance with the present invention, greater than 50% (as measured in terms of area) of the ground contacting sections of the shoe 300 includes the shaped fabric member 340. In the exemplary shoe 300 shown in FIGS. 5–7, the ground contacting surface of the outsole 330 includes the bottommost portion 362 of the heel 360 and the ball portion 331. More specifically, besides the heel portion 362, the only other portion of the outsole 330 which contacts the ground surface is the shaped fabric member 340. Thus in this particular embodiment, the shaped fabric member 340 comprises a substantial portion of the ground contacting surface of the outsole 330 as the outer surface 332 does not contact the ground surface.

The manufacture of the shoe 300 is preferably done in a similar or the same manner as the manufacture of the shoe 10 described in reference to FIGS. 10–12. More specifically, the manufacture is preferably a two stage molding process using the first and second molds 100, 200. In this embodiment, the bonding between the fabric backing layer 345 and the outsole 330 is clearly shown in the cross-sectional view of FIG. 7. After forming the shaped fabric member 340 using the first mold 100, the member 340 is then placed in the second mold 200 to form the outsole 330 illustrated in FIGS. 5–7. During the second molding process, the fabric sheet material 342 is not in contact with the second thermoplastic rubber that is added to the second mold 200 to form the remaining sections of the outsole 330 but rather the second thermoplastic rubber is disposed over and around the heated fabric backing layer 344 (preferably a thermoplastic rubber also).

Now referring to FIGS. 8–9 which illustrate yet another embodiment. In this embodiment, a shoe 400 is presented and generally includes an upper 410, a lower 420, and an outsole 430. The shoe 400 is in the form of a walking or leisure type shoe instead of the more formal shoes shown in FIGS. 1–7. The upper 410 and lower 420 have conventional constructions and are attached to one another using conventional techniques. The outsole 430 is also attached to the lower 420 using conventional techniques.

According to this embodiment, the outsole 430 includes a shaped fabric member 440 and a surrounding outsole surface 450. The shaped fabric member 440 has a fabric sheet material 442 disposed on an outer surface thereof so that the fabric sheet material 442 contacts the ground surface or the like during normal wear of the shoe 400. Bottom portions (surface 450) of the outsole 430 surrounding the shaped fabric member 440 are formed of any number of suitable materials including but not limited to plastic and rubber materials. The bottom portions of the outsole 430 are preferably generally planar with respect to the shaped fabric member 440 to define a substantially planar ground contacting surface of the outsole 430. In this embodiment, the shoe 400 includes two shaped fabric members 440, one disposed proximate a heel portion 402 of the shoe 400 and the other disposed proximate to a toe portion 404 of the shoe 400. A gap 444 is formed between the fabric sheet material 442 and the outer surface 432 of the outsole 430 in one exemplary embodiment.

The shaped fabric members 440 occupy an area which is at least greater than 50% of the area of the outsole 430 which contacts the ground surface. Preferably, the shaped fabric members 440 occupy greater than 50% to about 90% of the entire ground contacting surface of the outsole 430. The shaped fabric members 440 may have any number of shapes and sizes so long as the shaped fabric members 440 occupy greater than 50% of the surface of the outsole 430 which contacts the ground surface during normal wear.

The shoe 400 is preferably formed using the manufacturing process described herein with reference to FIGS. 10–12. In other words, the shaped fabric members 440 are formed using a first molding process and then are inserted into the second mold 200 (FIG. 12) where a second molding process is conducted. During the second molding process, the outsole 330 is formed having the shaped fabric members 440 as integral parts thereof. The result is that the outsole 430 of the shoe 400 is partially covered with fabric sheet material 442, while surrounding portions of the outsole 430 do not contain the fabric sheet material 442 and are formed of suitable materials. It will be appreciated that while thermoplastic rubbers are preferred for use in the molding process, other types of materials may be used so long as they produce the shaped fabric member having the characteristics described herein with reference to the various embodiments.

In yet another embodiment, a single molding process is used instead of the aforementioned two stage process. In other words, the outsole is first formed by cutting a piece of the fabric sheet material 62 (FIG. 1) to have a predetermined size and shape and then this cut piece is placed into a mold. It will be understood that several or more cut pieces of fabric sheet material 62 can be used to form the outsole 40 (FIG. 1) using the manufacturing process of this embodiment. The cut pieces are then placed into selected portions of the mold. For example, the cut pieces are preferably disposed in shaped recesses formed in the bottom of one of the dies. The other parts of the dies are formed so as to have a shape and dimensions for forming the outsole 40.

The dies of the mold are closed and then a thermoplastic rubber is injected into the mold. The mold can be of a hot type in which the dies are preheated prior to injecting the thermoplastic rubber or it may be a cold type in which the dies are not preheated (in this instance, the thermoplastic rubber is of sufficiently high temperature, that it flows throughout the dies). The injected thermoplastic rubber flows into the closed dies and flows over the one or more cut pieces of fabric sheet material that are laid in select locations of one of the dies. The cavity formed by the closed dies represents the shape and size of the outsole 40 that results from this manufacturing process.

The molded outsole structure is then permitted to cool down within the mold. Once the outsole 40 has cooled down, the dies are opened and the outsole 40 is removed. The resulting outsole 40 has the fabric sheet material 62 integrally formed as a part thereof due to the bonding between the fabric sheet material 62 and the thermoplastic rubber used to form the surrounding outsole 40. The ground contacting surface of the outsole 40 is formed of the fabric sheet material 62 and the injected thermoplastic rubber material.

Unlike the previously-described embodiments that use a two mold system, the manufacturing process according to this embodiment only uses a single mold system. This reduces equipment cost, etc.

Figure 13:
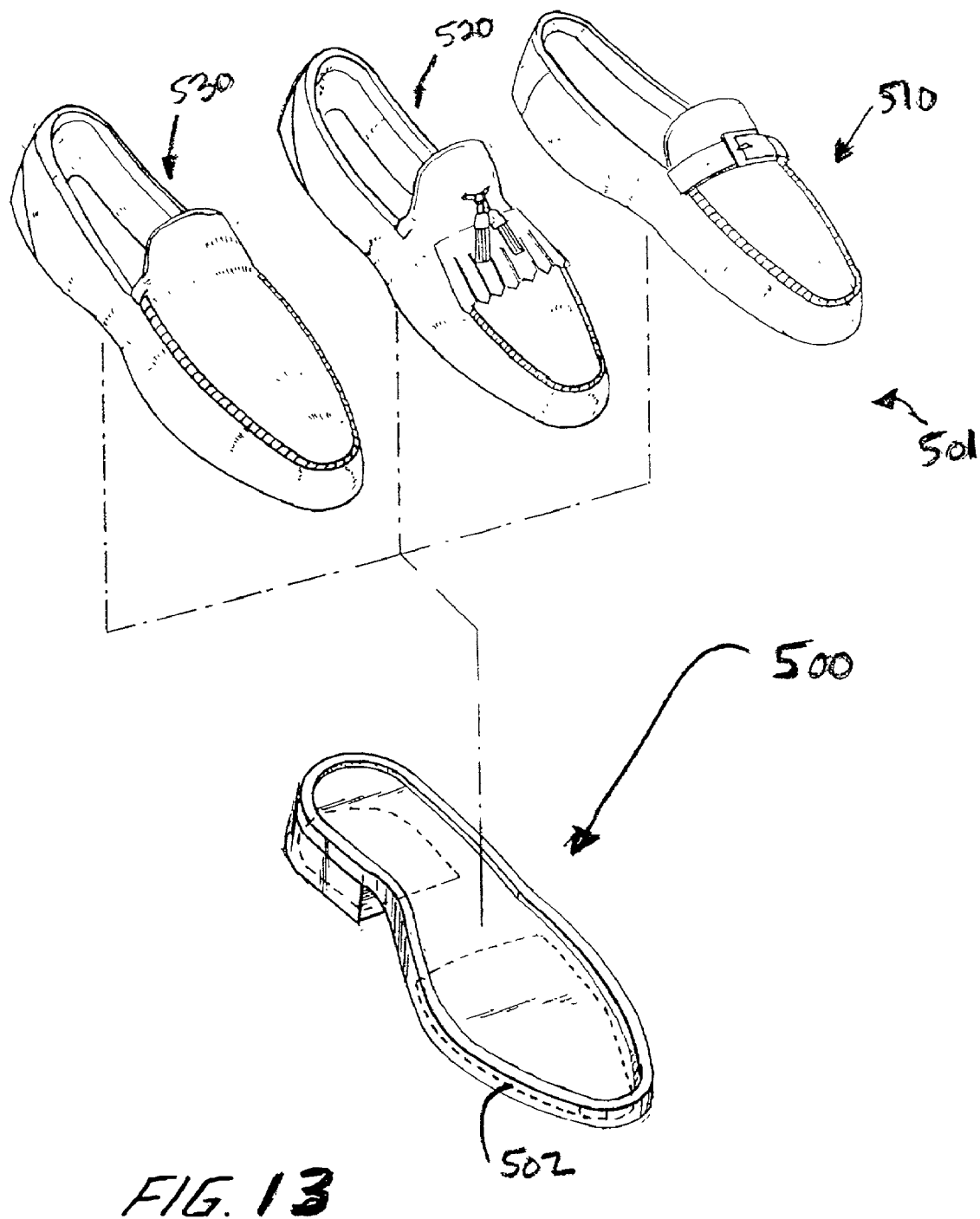
FIG. 13 is a perspective view of an exemplary outsole for mating with one of a plurality of selected uppers.

FIG. 13 illustrates yet another aspect of an outsole 500 which like the other embodiments includes a fabric component 502 (shown in phantom) that is integrally formed as part of the outsole 500. Because the outsole 500 is preferably manufactured using the previously-described one or two stage molding processes, the outsole 500 is manufactured at a first time and then later attached to an upper 510 to form the shoe 501 at a second later time. While this embodiment is discussed in terms of attaching the outsole 500 to an upper, it will be understood that this covers the attachment of the outsole 500 to a lower/upper construction, as is commonly used. However, for purposes of illustration and simplicity only, this embodiment is discussed in terms of attaching the outsole 500 to the upper. The time difference between the first time and the second time may be as short as a few minutes or may be as great as days, weeks, months, etc. Because the outsole 500 is not formed during the process in which the shoe 501 itself is formed, the outsole 500 may be manufactured at a location remote from where the shoe 501 is later formed by attaching the upper to the outsole 500. This provides a number of advantages as remote manufacturing sites may be used, as well as the ability to have different manufacturers produce and perform these separate operations. This is much different than prior art shoes where all the parts were assembled and then subjected to certain processes which caused the parts to be attached to one another, i.e., a heating operation during a single manufacturing process. In other words, the outsole in these shoes is not independently formed and then attached to the other components of the prior art shoe.

Another advantage of the present method is that it offers a wide degree of interchangeability. More specifically, one outsole 500 may be attached to any number of uppers and thus a great number of shoe styles incorporating the outsole 500 may be offered to the consumer. For example, a shoe manufacture may purchase the outsole 500 and then attach the outsole 500 to a lower/upper associated with that particular manufacturer. This operation is not overly complex because the lower/upper are attached using conventional techniques. It will be appreciated that this permits the outsoles 500 to be manufactured and distributed by themselves to those shoe manufacturers that wish only to purchase the outsoles 500 and then construct the shoe using their components.

In addition, the outsole 500 of a first configuration may be attached with any one of a multiple number of uppers having a variety of different styles. This results in a number of different shoe styles being formed using the same outsole 500 of the first configuration. FIG. 13 illustrates the outsole 500 being adapted to be attached to one of a first upper 510, a second upper 520, and a third upper 530.

Because the outsole 500 is independently formed and uppers 510, 520, 530 are independently formed, there is a great degree of interchangeability in that outsoles 500 may be mixed and matched with different uppers, including uppers 510, 520, 530, with relative ease. This is marked improvement over conventional shoes in which each component of the shoe was configured for use in one particular shoe style. In contrast, the present outsoles 500 permit a degree of customization that has heretofore not been available. Of course, it will be appreciated that some outsoles 500 (such as the type for a woman's high heeled shoe) will not be appropriate for use with some uppers that have configurations that are not compatible (for example, those that are configured for attachment to a flat outsole). In order for the outsole 500 to be compatible with the upper, the outsole 500 must engage the ground surface in a normal manner which permits the wearer to walk in the shoes without experiencing any difficulties.

FIG. 13 illustrates just one of the many combinations that are available for constructing a shoe that has a previously-formed outsole that is then later attached to any number of uppers to create different types of shoes.

In yet another aspect, a method of conducting business, more particularly, a method of customizing shoe design is provided. The method includes the steps of offering a plurality of outsole configurations from which to select, offering a plurality of shoe lower/upper designs from which to select, selecting one outsole configuration and one lower/upper configuration, determining if the selected outsole configuration is compatible with the selected lower/upper configuration, and indicating whether or not the selected outsole configuration is compatible with the selected lower/upper configuration.

Because the outsole is formed independently from the lower/upper, a particular outsole configuration that appeals to an individual may be selected. As previously-mentioned, the outsoles can be manufactured, stored, and transported independently of the other components of the assembled, finished shoe. This versatility permits the individual to select one outsole and then select a lower/upper that the user would like to mate with the selected outsole to form the shoe. Selection may be done using any number of different mediums, including using an interactive computer system or by manually selecting the components from a printed catalog or the like.

After a selection of each has been made, the compatibility of the selected components is assessed. The assessment may be based on a number of different parameters, including type of shoe (i.e., men's, women's, children's) and shoe style (i.e., flat outsole vs. curved outsole). For example, a flat outsole is compatible only with those lowers/uppers that are shaped to be attached to a flat outsole. The same holds true for curved outsoles for use with lowers/uppers that are shaped to be attached thereto. If a computer system is used, a computer generated image is preferably made of the finalized shoe and then displayed to the user.

In one embodiment, this method may be implemented using a web site. For example, a home page may be constructed and displayed using a conventional browser. The browser includes navigation buttons to move forwards and backwards among various web pages and provides further functionality including secure transmission of documents over the Internet or other distributed computer network, for example, between the browser (at the client side) and a web server, such the server hosting the home Web site.

Figure 14:
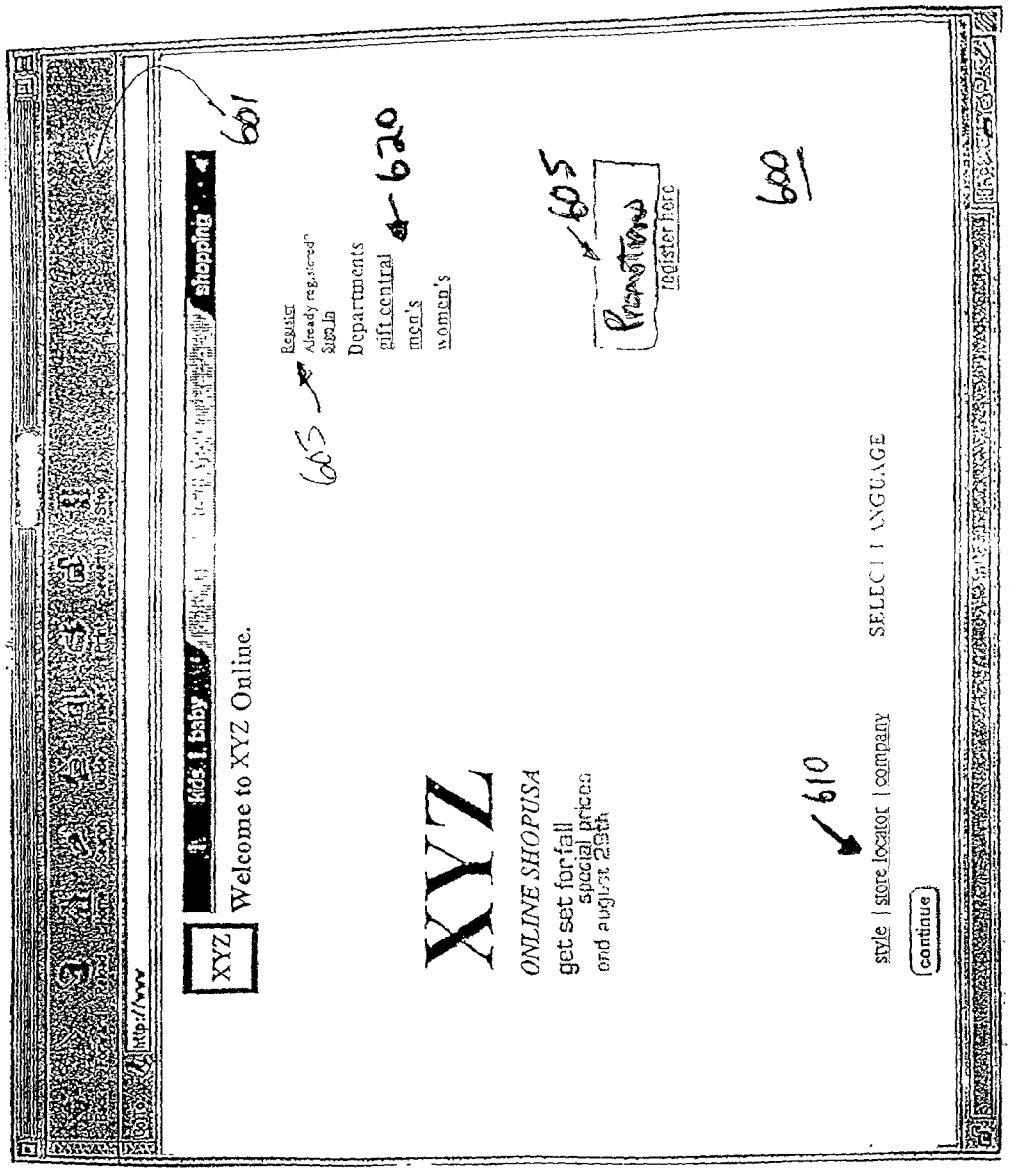
FIG. 14 illustrates a home page of a fictitious Web site, "XYZ Online"

FIG. 14 shows an exemplary web page 600 which includes information provided at the web site, such as description of the goods and services that are available for purchase by the consumer. In this particular application, the web page 600 is an initial screen at a web site that permits custom construction and ordering of shoe outsoles and other shoe components, e.g., uppers, that are used in the construction of the shoe.

For example, web page 600 includes contact information 610 about the manufacturer of the shoe components, an options menu 620 for selecting a general shoe type. In other words, the user can select a shoe department for purposes of viewing the various shoes offered. For purpose of illustration, FIG. 14 only illustrates a men's and a women's department; however, it will be understood that other departments, such as children's, babies, etc. may be available. The web page 600 contains other conventional items, such as a tool bar 601, a log in section 603, and a promotional area 605.

Figure 15:
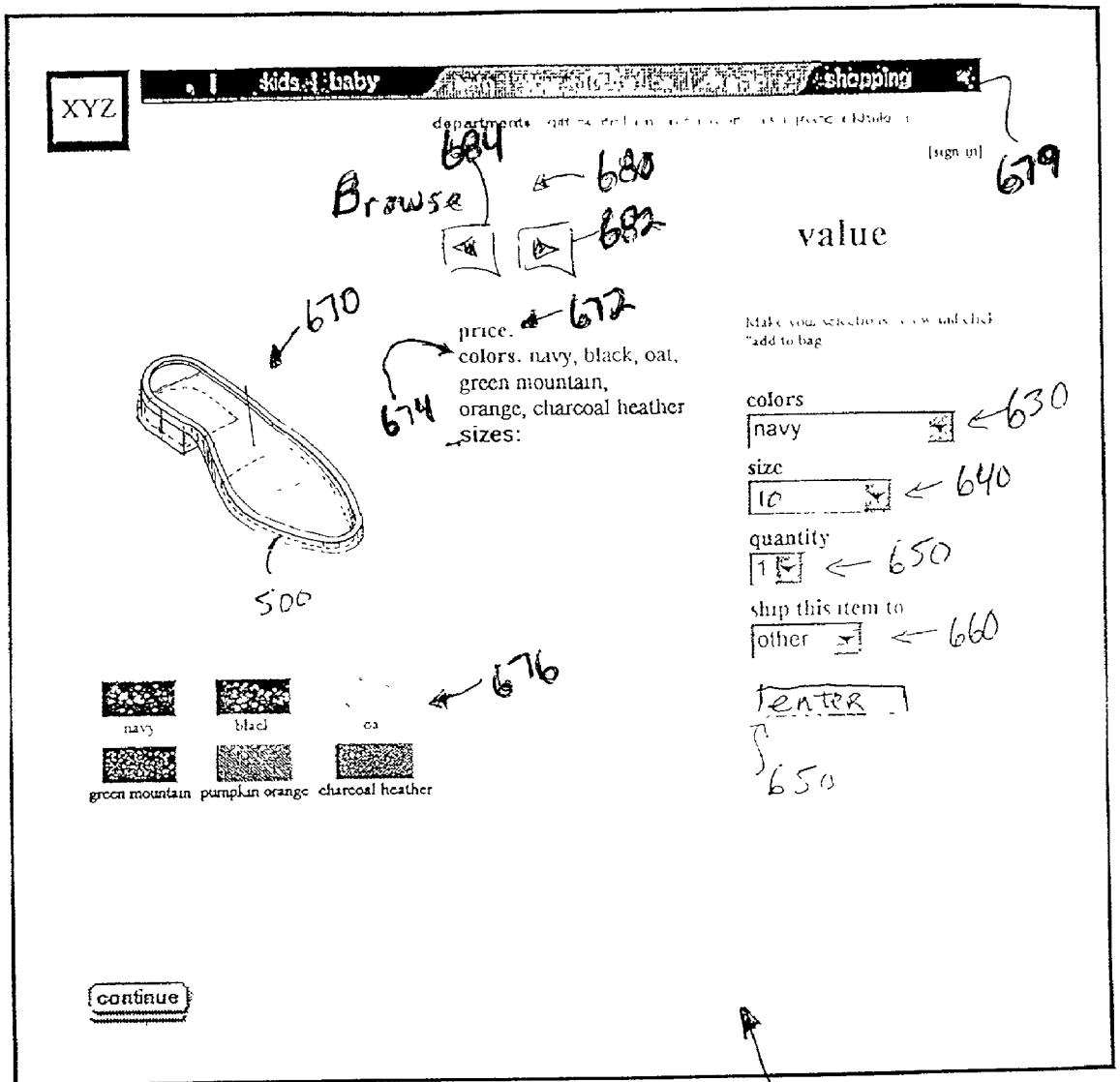
FIG. 15 illustrates a first item selection page of the Web site of FIG. 14.

After the user has entered the particular department, the user begins construction of the shoe by selecting an outsole. FIG. 15 illustrates a first item-selection page 620 for selecting outsole 500. The user is given a number of options that are available in menus (i.e., the illustrated pull down type menus). For example, a color menu 630, a size menu 640, and quantity menu 650 are provided and permit the user to make various selections before proceeding with ordering the selected outsole using conventional Web site methods, including clicking on a button 650. In this case, the button 650 is labeled as an "enter" button but it can likewise be labeled as a "continue" button, etc. A shipping menu 660 is also provided for the user to input the necessary shipping information if the user wishes to directly order at this point and bypass the other Web pages of the system. For example, the user may be reordering a certain outsole or may be adding to an order and therefore does not have to view available uppers, etc. Page 620 also has a tool bar 679 that presents the user with various options, such as a directory feature which when activated, displays a directory for the user; other features, such as a help feature are provided.

The page 620 preferably also contains other information, such as a representation 670 of the selected outsole and further pricing information 672, and available colors and sizes 674 can be depicted for the user with the colors also being graphically indicated in a section 676.

To permit the user to navigate amongst the available outsoles, conventional mechanisms are provided, such as browse functionality 680 that permits the user to browse forward 682 and browse backward 684. Preferably, each time the user browses either forward or backward, the selected outsole is graphically illustrated on the web page.

This permits the user to browse much faster, as the user can scan the illustrated outsoles until coming to one that is of interest. If the user wishes to proceed directly with purchasing the uppers without having to go through the additional Web pages, the user can click on the button 660 and subsequently, the user inputs conventional shipping information, including shipping address, billing address, payment information, etc.

Figure 16:
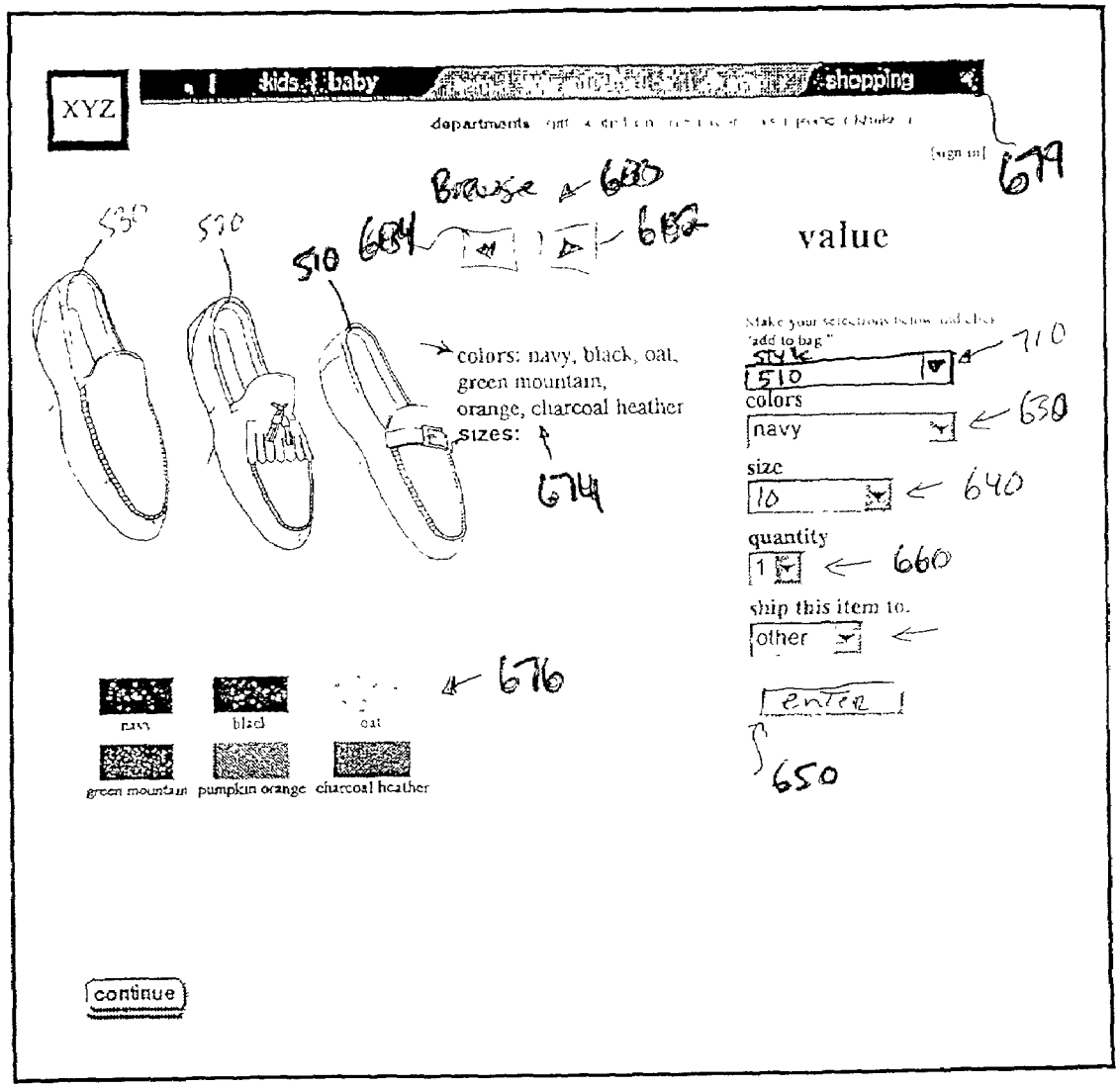
FIG. 16 illustrates a second item selection page of the Web site of FIG. 14.

Once the user has selected an outsole (i.e., by clicking button 650), the user then browses through various uppers that meet certain prescribed characteristics that permit the uppers to be used with the selected outsole. The system is designed, in one embodiment, so that the uppers that are made available to the user for browsing depend from the outsole selected. In other words, the user will not be permitted to view or browse through any uppers that are not complementary to the selected outsole. FIG. 16 illustrates a second item-selection page 700 for selecting one or more uppers for combination with the previously selected outsole to form the completed shoe. It will be understood that a single page 700 can be used to illustrate one upper or, as is shown in FIG. 16, one web page can be used to illustrate multiple uppers.

In the illustrated embodiment, FIG. 16 includes three different types of uppers 510, 520, 530, respectively, that can be combined with the outsole 500 of FIG. 15. In addition, to the previously mentioned menu options, the user is provided with another menu option 710 that permits the user to highlight and select one of the uppers that is shown. For example, the menu 710 can identify the uppers by any number of means including by name (i.e., style name) or by a reference number (i.e., style number). Once the user has selected an upper and supplied all necessary information, such as color, size, and quantity, the user then proceeds to the next step by pressing the "enter" button 650. It will be appreciated that the system can be configured so that the user does not have to enter the color and the size of the upper as default settings for these selections can be directly linked to the inputted color and size selections that were previously made relative to the outsole. In other words, the user does not have to enter the color and size of the upper as the default settings for these selections will match those previously made relative to the outsole. It will also be appreciated that the color of the upper can differ relative to the color of the outsole. In other words, the outsole and upper do not have to be the same color and the user when constructing the shoe can select one color (i.e., black) for the outsole and another color (i.e., navy) for the upper. This permits a vast number of different shoe constructions and appearances to be possible.

Figure 17:
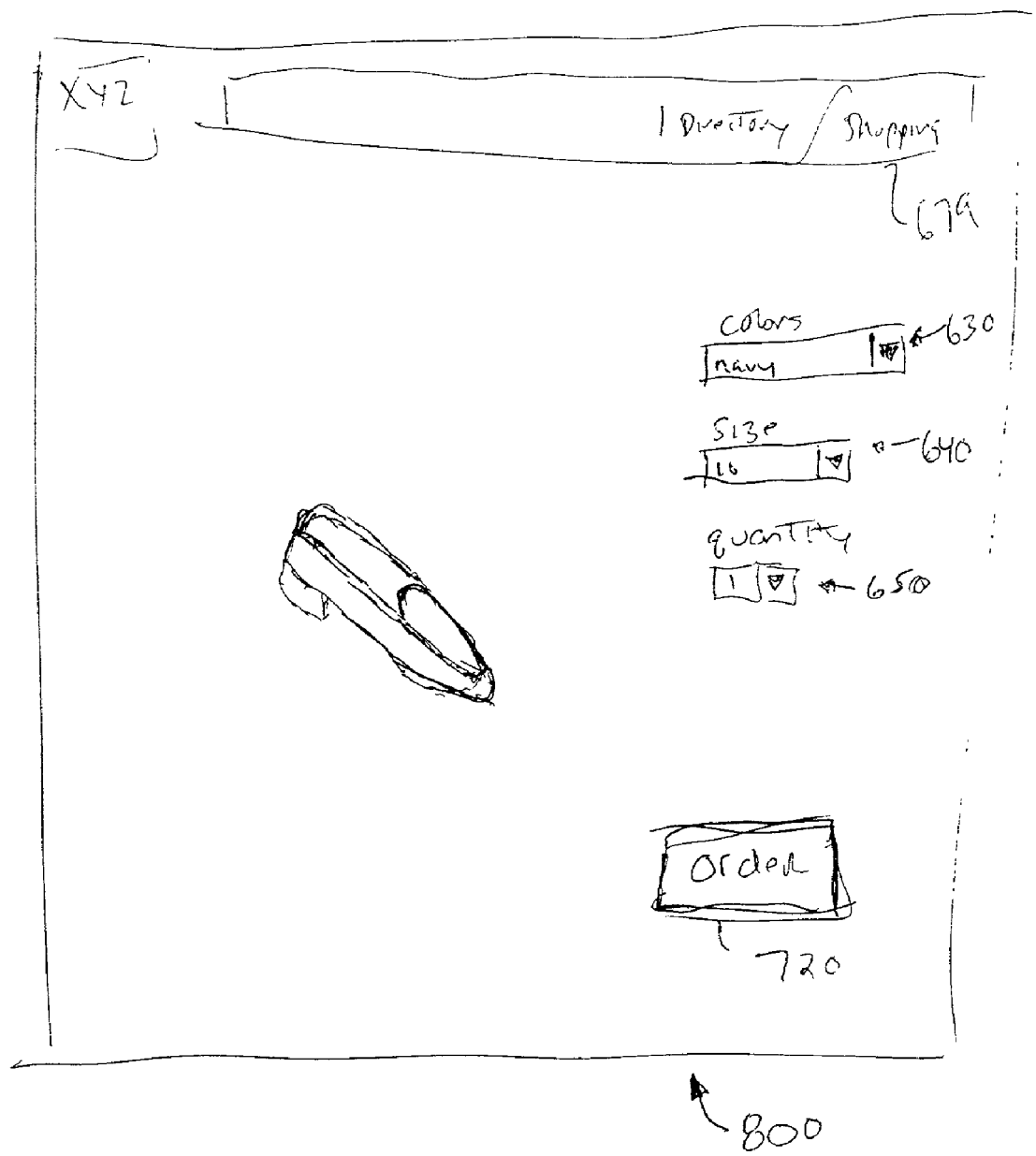
FIG. 17 illustrates a page of the Web site of FIG. 14 in which a constructed shoe, formed of a selected outsole and upper, is illustrated.
Figure 18:
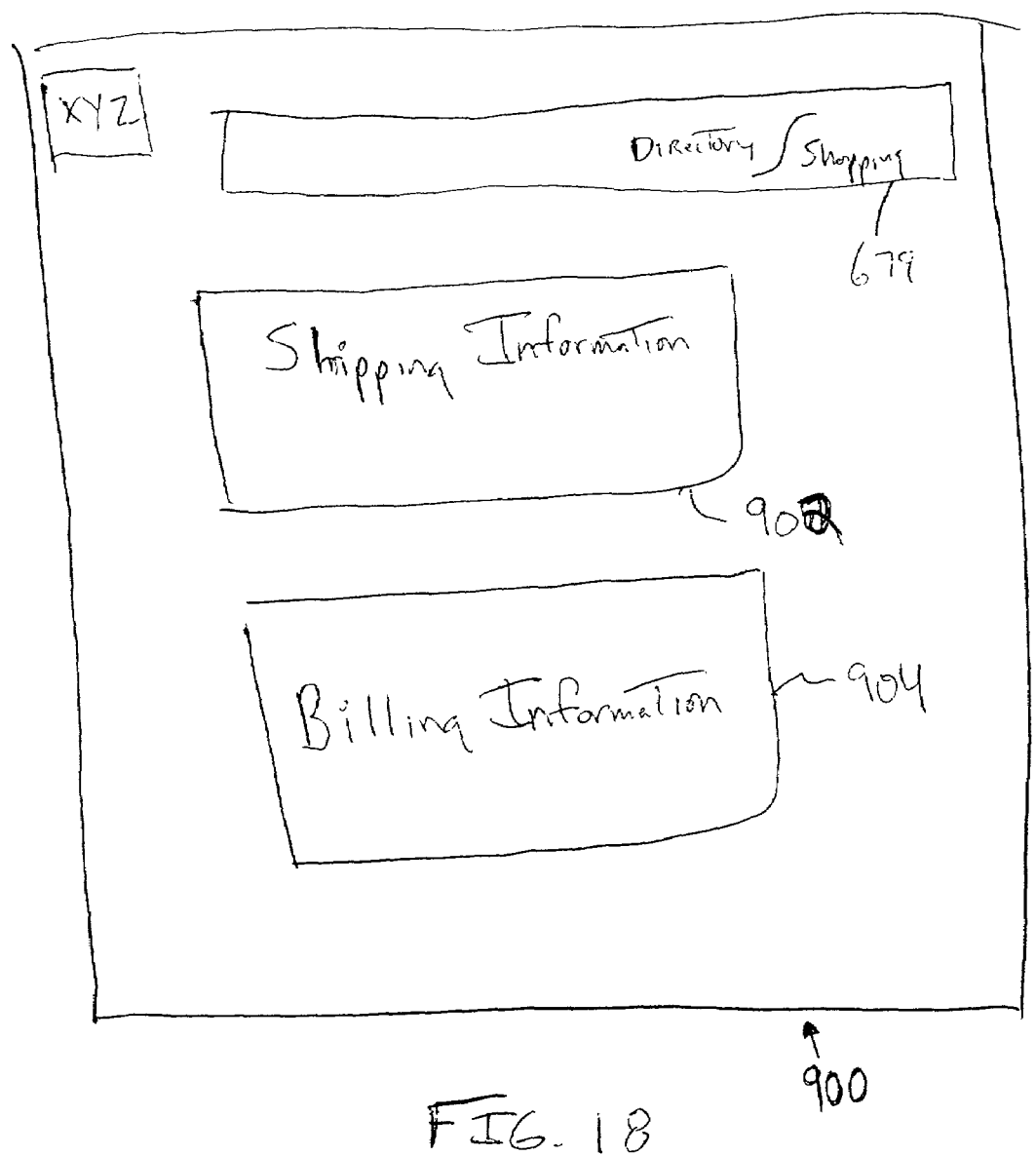
FIG. 18 illustrates a page of the Web site of FIG. 14 for ordering shoe components.

Once the user selects the upper, the user then proceeds by pressing the button 650. Referring to FIG. 17, next another web page 800 is shown in which the assembled shoe is shown to the user. The assembled shoe is a combination of the previously-selected upper and outsole. If the user is satisfied, the user can continue and order the various components by pressing on the order button 720. Because the user has already previously entered the color, size and quantity of each particular upper and outsole, the web page that is accessed after the user has clicked on the order button 720 preferably lists these inputted quantities. However, the user is permitted to modify this information by simply accessing one of the menus and altering the selected information. FIG. 18 illustrates a page 900 that is displayed after the user presses the order button 720 or after the user has selected the button 660 in a previous page. Traditional ordering options are also provided to the user, such as shipping information 902 and payment (billing) information 904. Once the user provides this information 902, 904, the transaction is completed and the user can exit or continue by selecting an appropriate button that is located on the tool bar or elsewhere on the page 900.

Thus, it will be appreciated that the user can order a quantity of a single outsole and then order different types of uppers for assembly with the selected outsole. Further, the user can order multiple types of outsoles and multiple types of different uppers for mixing and matching with the ordered outsoles. The present system also automatically discards outsole/upper combinations that are not possible so that the user can not order two components that are not complementary to one another. In the above exemplary embodiment, this occurs after the outsole is selected by the user and a search is conducted in a database for complementary uppers. However, it will be appreciated that the system can also be configured so that the user first selects an upper and then a search of complementary outsoles is conducted and displayed to the user. This embodiment permits the user to first select what may be regarded as the more visually dominant part of the shoe and then the user is supplied with the various outsoles from which a selection is to be made.

The above system therefore provides graphical representations that are shown for all of the available outsoles, uppers, and other components. This permits the user to visualize how any given outsole will look with one of the available uppers. Moreover, the display illustrates what the resulting shoe looks like when the selected upper and outsole are combined and attached to one another.

It will be appreciated that once the user selects one outsole, a search for complementary uppers is conducted in a database containing all upper constructions that are offered by not only this particular manufacturer but also other manufacturers. Whether an upper is complementary to an outsole is predetermined and included and preferably, a generic upper is provided that can be combined with one or more outsoles of various types. For example, the generic upper can be provided with one or more features that permit it to be adapted for use with several or more outsoles. For example, the upper can be provided with an incomplete construction (i.e., a loose seam is present) to permit the upper to be manipulated and then attached to different types of outsoles. As part of the attachment process, the upper is then completely constructed, e.g., as by sewing all loose seams, etc.

If the selected outsole is one that is generally designated as having an intended use as part of a woman's high heeled shoe, then the compatible lower/uppers will be those that are likewise constructed for a woman's high heeled shoe. For example, the outsole for such a high heeled shoe is typically not planar but rather is curved to accommodate the heel and therefore, the lower/upper needs to capable of accommodating and fitting along such a curved section. The advantage of having outsoles and uppers that may be mixed and matched is that the same outsole may be matched with a number of uppers to generate a plurality of different looking shoes. The provides the consumer with more options and reduces manufacturing costs as outsoles may be made independently of the other components and then later attached to selected uppers at a later time.

While the invention has been particularly shown and described with reference to preferred embodiments thereof, it will be understood by those skilled in the art that various changes in form and details may be made therein without departing from the spirit and scope of the invention.

What is claimed is:

1. A method of manufacturing a shoe, comprising the steps of:
   a) inserting a sheet of fabric material into a first injection mold;
   b) injecting a curable, flowable, thermoplastic material into the first mold into contact with the sheet of fabric material for bonding therewith upon curing to form an integrated fabric-thermoplastic part;
   c) removing the integrated fabric-thermoplastic part from the first mold;
   d) inserting the integrated fabric-thermoplastic part into a second mold;
   e) injecting a curable, flowable thermoplastic material into the second mold into contact with the integrated fabric-thermoplastic part for bonding therewith upon curing to form an outsole;
   f) removing the outsole from the second mold; and
   g) independently non-moldably attaching a shoe upper to the outsole at a site at which molding is not performed.

2. The method of claim 1, wherein the injecting step includes preheating the mold.

3. The method of claim 1, wherein the injecting step includes heating thermoplastic pellets to form the flowable, thermoplastic material.

4. The method of claim 1, wherein the attaching step is performed at a region of the outsole that is not covered by the fabric material.

5. The method of claim 4, wherein the fabric material is exposed at an outer surface of the outsole, and wherein the attaching step is performed at an inner surface of the outsole remotely from said outer surface.

6. The method of claim 1; and further comprising the step of forming an annular gap surrounding the integrated fabric-thermoplastic part in the outsole.

7. The method of claim 1, wherein the thermoplastic material injected into both molds is the same material.

8. The method of claim 1, wherein the outsole has an outer surface which contacts the ground over a ground-engaging area, and wherein the fabric material is exposed at the outer surface over an area at least half of the ground-engaging area.

* * * * *